UNITED STATES PATENT OFFICE.

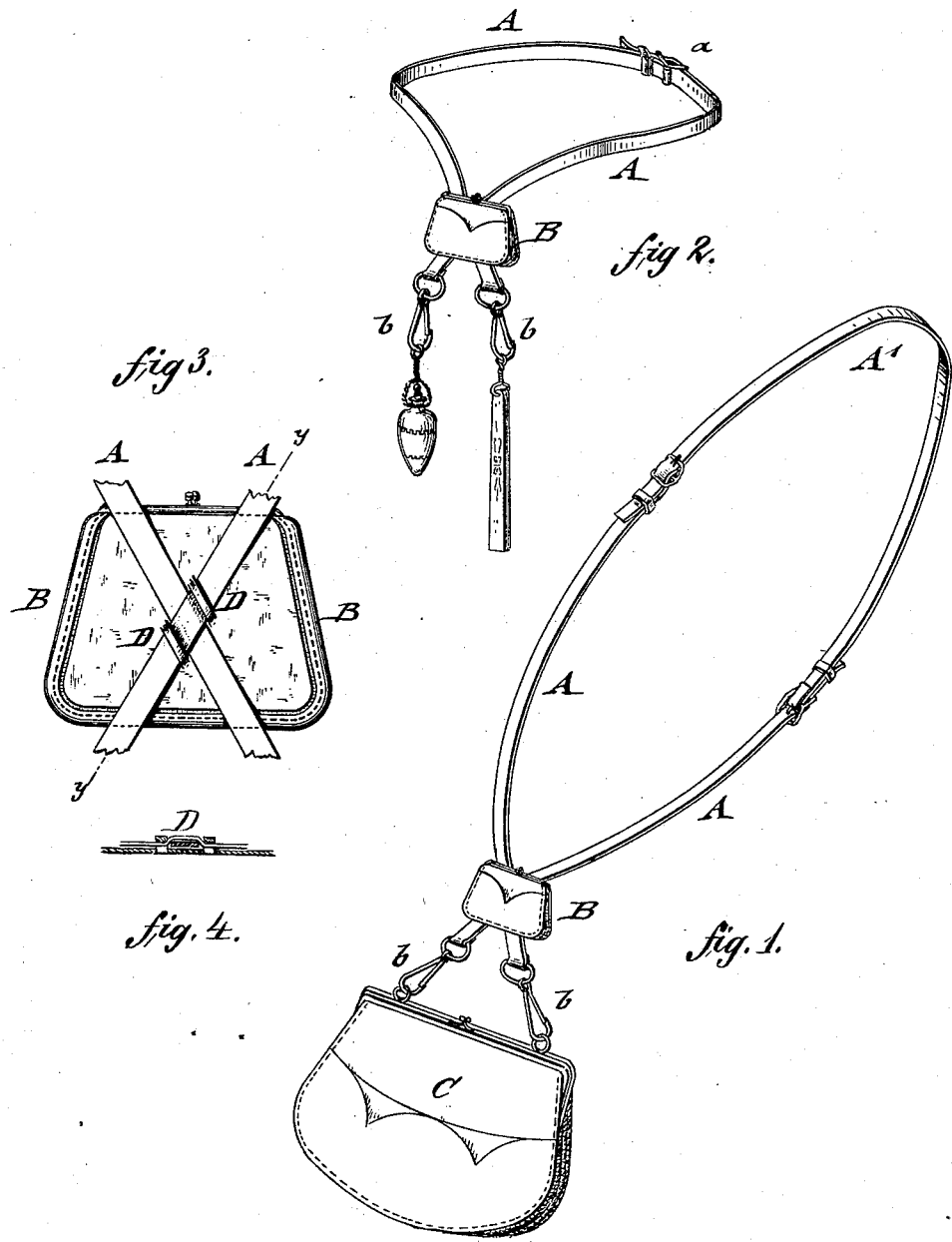

FRIEDMAN STERNHEIMER, OF NEW YORK, N. Y.

WAIST-BELT.

SPECIFICATION forming part of Letters Patent No. 264,205, dated September 12, 1882.

Application filed June 15, 1882. (No model.)

*To all whom it may concern:*

Be it known that I, FRIEDMAN STERNHEIMER, of the city, county, and State of New York, have invented certain new and useful Improvements in Ladies' Waist-Belts, of which the following is a specification.

This invention has reference to an improved lady's waist-belt, which is arranged with a pocket-book so as to facilitate the carrying of money, and with suspension devices for a satchel, fan, or other articles; and the invention consists of a lady's waist-belt provided with a pocket-book that is made adjustable on the belt and arranged with suspension devices below the hook.

In the accompanying drawings, Figure 1 represents a perspective view of my improved lady's waist-belt arranged as a shoulder-strap for supporting a satchel. Fig. 2 is a perspective view of the same when used around the waist, and Figs. 3 and 4 are respectively a detail rear view of the pocket-book and a detail section on line $y$ $y$, Fig. 1, of the means whereby the same is adjustably arranged on the belt.

Similar letters of reference indicate corresponding parts.

In the drawings, A represents a lady's waist-belt, to which is applied a pocket-book, B, in such a manner that it can be adjusted to any desired position on the belt A. The belt A is arranged with a buckle, $a$, so that it can be elongated by an extension-strap, A', both together being of sufficient length to form a shoulder-strap for the support of a satchel, C, which is attached to spring-clasps $b$ $b$ or equivalent suspension devices below the pocket-book B, as shown in Fig. 1.

When the device is used as a belt the spring-clasps $b$ $b$ are used for suspending a fan, smelling-bottle, or other accessories.

The pocket-book B can be adjusted to any desired position on the belt A, it being provided at its back part with guide-straps, clasps, or other guide devices D, whereby the book can be adjusted on the belt. The pocket-book can thus be arranged in a position most convenient for use on the belt, whether the same is worn as such or used as a shoulder-strap, so that the waist-belt forms a very neat and convenient device for ladies in traveling, and in country and watering places.

Having thus described my invention, I claim as new and desire to secure by Letters Patent—

1. As an improvement in waist-belts, the combination, with a belt, of a pocket-book and of means whereby the same can be adjusted on the belt, substantially as set forth.

2. As an improvement in waist-belts, the combination of the belt A, pocket-book B, slide D, or other analogous means, whereby the pocket-book is adjusted on the belt and suspension devices $b$ $b$ applied to the belt below the pocket-book, substantially as and for the purpose set forth.

In testimony that I claim the foregoing as my invention I have signed my name in presence of two subscribing witnesses.

FRIEDMAN STERNHEIMER.

Witnesses:
    PAUL GOEPEL,
    CARL KARP.